(12) United States Patent
Wu et al.

(10) Patent No.: US 7,339,784 B2
(45) Date of Patent: Mar. 4, 2008

(54) FASTENING AND AUTOMATIC EJECTING STRUCTURE FOR BATTERY OF A NOTEBOOK

(75) Inventors: Cheng-Yu Wu, Taipei (TW); Yun-Tang Lin, Taipei (TW)

(73) Assignee: Inventec Corporation, Taipei (TW)

( * ) Notice: Subject to any disclaimer, the term of this patent is extended or adjusted under 35 U.S.C. 154(b) by 143 days.

(21) Appl. No.: 11/391,557

(22) Filed: Mar. 29, 2006

(65) Prior Publication Data
US 2007/0230098 A1   Oct. 4, 2007

(51) Int. Cl.
*G06F 1/16* (2006.01)
(52) U.S. Cl. .................. 361/683; 439/160; 710/304; 347/104
(58) Field of Classification Search .......... 439/131, 439/152, 160, 500; 710/303, 304, 305; 312/223.2–223.6; 347/54, 104; 361/679–687, 724–727
See application file for complete search history.

(56) References Cited

U.S. PATENT DOCUMENTS 5,627,974 A * 5/1997 Watts et al. ............... 710/304
5,740,012 A * 4/1998 Choi ........................ 361/686
5,768,098 A * 6/1998 Murayama ................ 361/684

* cited by examiner

*Primary Examiner*—Hung Van Duong
(74) *Attorney, Agent, or Firm*—Birch, Stewart, Kolasch & Birch, LLP

(57) ABSTRACT

A fastening and automatic ejecting structure for a battery of a notebook is provided, which comprises: a first fastening element disposed on a predetermined position of the computer and swinging to and fro between a first position and a second position in a predetermined direction; a second fastening element disposed on a predetermined position of the battery and moving to and fro between a third position and a fourth position in a predetermined direction along with the battery. Moreover, when the battery is pushed and moves from the third position to the fourth position, the first fastening element will be forced to swing towards the second position and to be bound with the predetermined position of the battery. When the battery is pushed again and moves from the fourth position to the third position, the first fastening element will be released from the battery.

11 Claims, 3 Drawing Sheets

FASTENING AND AUTOMATIC EJECTING STRUCTURE FOR BATTERY OF A NOTEBOOK

BACKGROUND OF THE INVENTION

1. Field of Invention

The present invention relates to a peripheral equipment of a notebook, and more particular to a fastening construction for a user to fix a battery in a computer or release it from the computer simply by pushing the battery itself.

2. Related Art

As is well known, taking out a chargeable battery used in a notebook after charging it fully helps to reduce the occurrence of memory effect. However, since the design of a conventional notebook tends to put an emphasis on how to prevent the battery from departing from the computer due to carelessness, instead of on how to make it easy for the battery to be demounted, therefore, the operation of dismounting the battery of a conventional notebook, whether by pushing against both of two hooks or by unclosing the lid at first, is extremely inconvenient.

SUMMARY OF THE INVENTION

In view of the above-mentioned problem, a primary object of the invention is to provide a fastening and automatic ejecting structure for a battery of a notebook for facilitating a user's putting the battery in or taking it out from the notebook.

In order to achieve the above object, the invention provides a fastening and automatic ejecting structure for a battery of a notebook, which comprises a first fastening element disposed in a predetermined position of the computer and swinging to and fro between a first position and a second position in a predetermined direction when subjected to a pushing force; a second fastening element disposed in a predetermined position of the battery and moving to and fro between a third position and a fourth position in a predetermined direction along with the battery. When the battery moves from the third position to the fourth position, the first fastening element is forced to swing towards the second position, and the predetermined position of the battery is forced to be bound with the first fastening element.

Additionally, a retractable stop piece is further disposed in the computer, while a groove corresponding to the stop piece is disposed in the battery. After the battery is put in an accommodating space predetermined in the computer, with the stop piece and the groove capable of being engaged correspondingly, the battery can be ensured not to fall out when touched by mistake by a user during operation of the notebook.

Detailed characteristics and advantages of the invention are set forth in detail in the detailed description below, and the contents thereof are sufficient to make any of those skilled in the art aware of technology contents of the invention, according to which the invention is embodied. Any of those skilled in the art can easily appreciate the related objects and advantages of the invention according to contents, claims and drawings disclosed in this specification.

The above illustrations on contents of the invention and the below ones on detailed description are exemplary and explicative to the theory of the invention and provide further interpretations to claims of the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and which thus is not limitative of the present invention, and wherein.

DETAILED DESCRIPTION OF THE INVENTION

Figure 1:
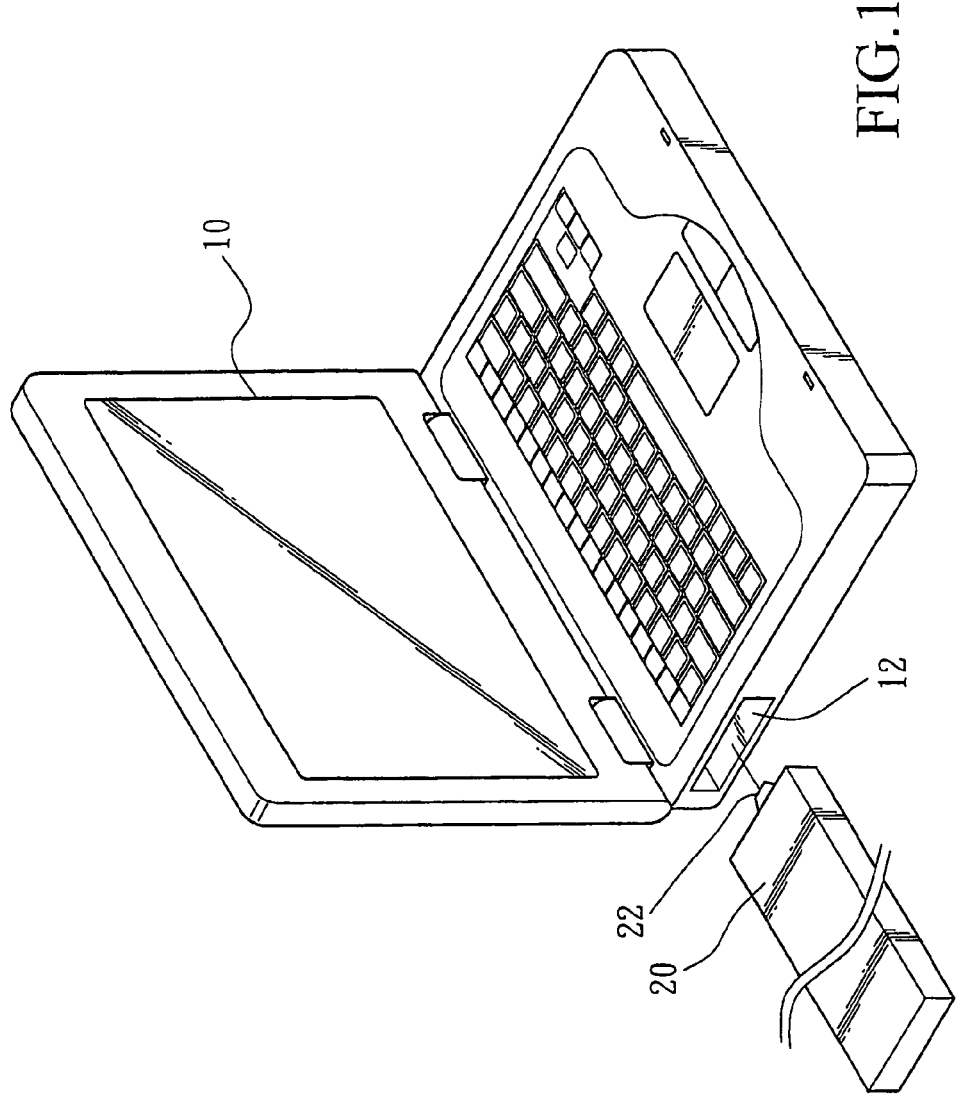
FIG. 1 is a three-dimensional diagram of an embodiment of the invention.

In order to have a further understanding of objects, constructions, characteristics, and functions of the invention, the invention is illustrated in detail in accompany with the embodiments as follows.

Referring to FIGS. 1, 2, 3, and 4, a fastening and automatic ejecting structure for a battery of a notebook provided in the invention is shown, which are disposed in a notebook 10 and on a battery 20 respectively such that the battery 20 is fixed in the notebook 10.

An accommodating space 12 recessing inwards by an appropriate depth is disposed on the lateral edge of the notebook 10, for the battery 20 to accommodate. A first fastening element 14 is disposed at the bottom of the accommodating space 12 so as to fasten a second fastening element 22 disposed on the outer edge of the battery 20.

The first fastening element 14 comprises: a slightly tubular housing 140 having an opening end; a circuit track 141 disposed on the inner wall of the housing 140, in which two wedge-shaped blocks 1410 as well as a first positioning point 1410 and a second positioning point 1412 are disposed; a slide block 142 disposed in a way of moving to and fro within the opening end of the housing 140, having a pair of swing arms 143 capable of swinging to opposite positions disposed at the outward end thereof, and at the end of each swing arm 143, a first fastening portion 144 is protrudingly disposed respectively, which swings between a wide open first position and a retracted second position along with the swing arms 143; a pair of springs 145 respectively located between the inner end of the slide block 142 and the bottom of the housing 140, which constantly applies a force towards the outside of the opening end to the slide block 142; and a connecting rod 146, having its outward end pivotally disposed on the slide block 142, and its inward end slip within the circuit track 141.

The second fastening element 22 is fixed on the outer edge of the battery 20, which is a convex pillar having a taper shaped tail, and moves to and fro between a third position and a fourth position within the accommodating space 12 along with the battery 20. The front end of the second fastening element 22 is provided with a second fastening portion 221, which is groove-shaped and is circlewise disposed on the peripheral edge of the second fastening element 22, and the shape of the inner edge of which is substantially the same as that of the outer edge of the first fastening portion 144.

Figure 2:
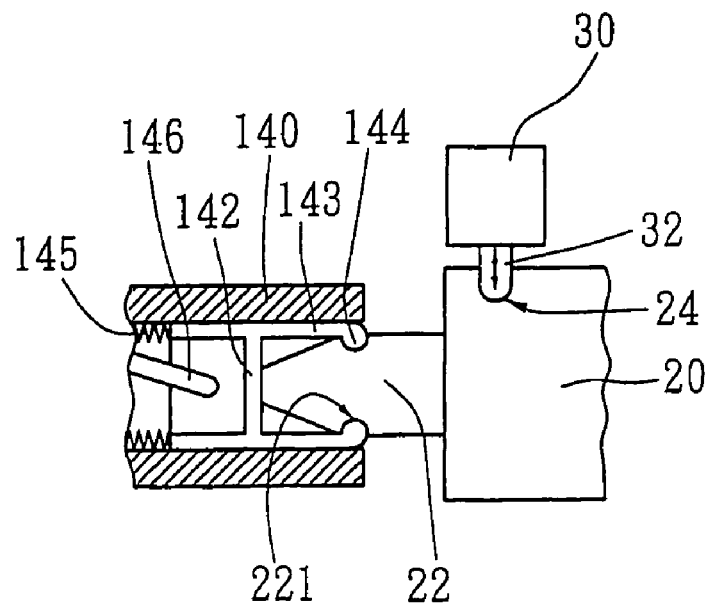
FIG. 2 is a sectional view of an embodiment of the invention when forming a fastened state.

When the battery 20 is pushed into the accommodating space 12 by a user and moves from the third position to the fourth position, as shown in FIG. 2, the slide block 142 will be pushed by the second fastening element 22 and moves inwards. And the two swing arms 143 moving inwards along with the slide block 142 are restricted by the inner wall at the opening end of the housing 140 and swing face to face to the second position, and each of the first fastening portions 144 on the swing arms is inserted into the corresponding second fastening portion 221. After a user stops pushing the battery 20, since the inner end of the connecting rod 146 has moved to the first positioning point 1411 and has been blocked by a wedge-shaped block therein, the slide block 142 is restricted and unable to move outwards any more, such that each of the first fastening portions 144 and each of the second fastening portions 144, 221 are fastened with each other.

Figure 3:
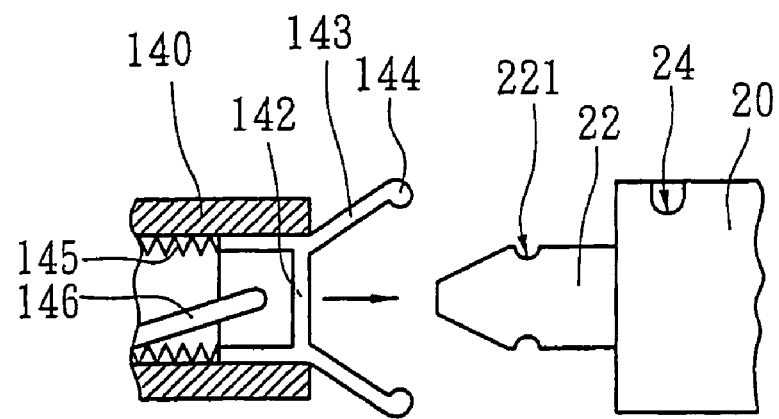
FIG. 3 is a sectional view of an embodiment of the invention when forming a released state.
Figure 4:
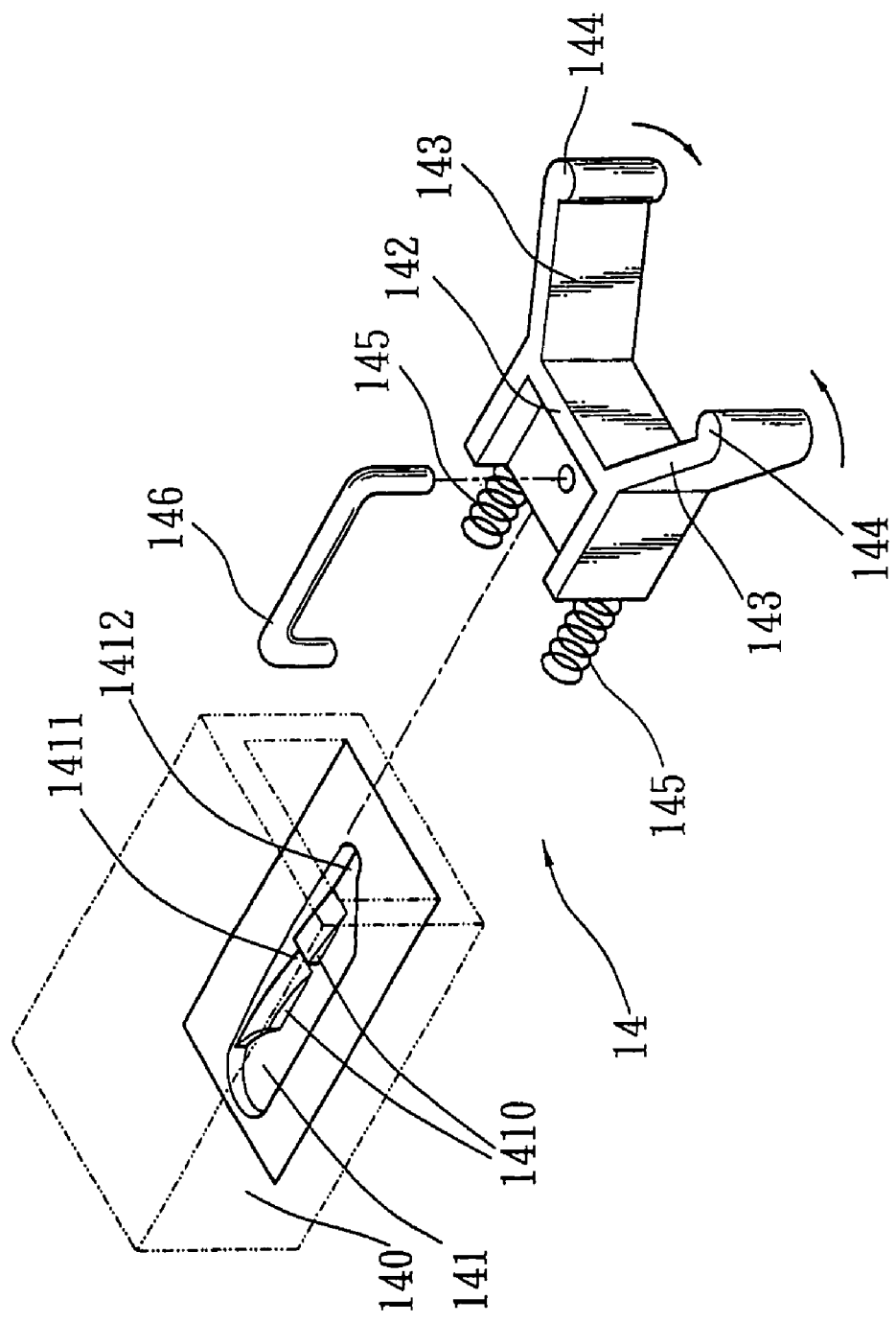
FIG. 4 is an exploded three-dimensional diagram of a fastener in an embodiment of the invention.

When the battery 20 having been disposed in the fourth position is again pushed by a user, the slide block 142 moving inwardly will drive the inner end of the connecting rod 146 across each of the wedge-shaped blocks 1410 and move to the second positioning point 1412 closer to the opening end of the housing 140 along a circuit direction of the track 141 with the force of each of the springs 145. At this time, for not being restricted by the housing 140 any more, each of the swing arms 143 moves outwardly to outside of the opening end, allowing each of the first positioning portions 144 thereon to widely open to the first position, such that the first fastening element 14 is separated from the second fastening element 22, as shown in FIG. 3. While the battery 20 will be ejected by the first fastening element 140 from the fourth position to the third position with the force of the springs 145 after a user stops pushing.

With the cooperation of each of the above-mentioned means, two kinds of states of fixed or released can be formed easily between the battery 20 and the notebook 10 only by pushing the battery 20 repeatedly by a user such that it moves towards the inside of the accommodating space 12.

Additionally, in order to secure a state in which the battery 20 is fixed in the accommodating space 12, a stop piece 32 is further disposed in the notebook 10 of the present invention, which is driven by a electromagnetic valve 30 to retract in a direction perpendicular to the moving direction of the battery 20; a groove 24 is further disposed on the lateral edge of the battery 20.

When the notebook 10 is in a startup state, the electromagnetic valve 30 will be activated so as to drive the stop piece 32 to protrude such that it is inserted into the groove 24, which avoids the possibility that data should be lost if the battery 20 fell out on an incautious impact.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fastening and automatic ejecting structure for a battery of a notebook, for fixing a battery in an accommodating space of a notebook, comprising:
    a first fastening element, disposed on a predetermined position of the computer and swinging to and fro between a first position and a second position in a predetermined direction when subjected to a pushing force; and
    a second fastening element, disposed on a predetermined position of the battery and moving to and fro between a third position and a fourth position in a predetermined direction along with the movement of the battery;
    wherein, when the battery moves from the third position to the fourth position, the first fastening element is forced to swing towards the second position and to be bound with the second fastening element, and when the battery is pushed again towards the fourth position, the first fastening element will swing towards the first position thereby departing from the second fastening element, and the battery is then pushed towards the third position, such that the battery ejects automatically from the notebook.

2. The fastening and automatic ejecting structure for a battery of a notebook as claimed in claim 1, wherein an accommodating space opening outwards is disposed in the computer for the battery to insert in, and the first fastening element is disposed in the accommodating space.

3. The fastening and automatic ejecting structure for a battery of a notebook as claimed in claim 2, wherein at least one first positioning piece is disposed in the accommodating space of the computer to fix the battery in the fourth position.

4. The fastening and automatic ejecting structure for a battery of a notebook as claimed in claim 3, wherein the first positioning piece comprises:
    a housing, having a tubular inner space and an opening end, on the inner wall of which a circuit track having at least two positioning points is disposed;
    a slide block, moving to and fro at an opening end of the housing, and the moving direction thereof is parallel to that of the second fastening element;
    at least one swing arm disposed at one end of the slide block in a swinging way, for the first fastening element to be disposed upon;
    a connecting rod, having one end pivotally disposed on the slide block, the other end moving circularly in the track and stopping at each of the positioning points; and
    an elastic element, disposed between the housing and the slide block.

5. The fastening and automatic ejecting structure for a battery of a notebook as claimed in claim 4, wherein a second positioning piece is disposed on the housing of the battery, and the second fastening element is disposed on the outer edge of the second positioning piece.

6. The fastening and automatic ejecting structure for a battery of a notebook as claimed in claim 5, wherein the second positioning piece is convex pillar shaped, and the second fastening element is disposed in a groove on the outer edge of the convex pillar.

7. The fastening and automatic ejecting structure for a battery of a notebook as claimed in claim 1, wherein a second positioning piece is disposed on the housing of the battery, and the second fastening element is disposed on the outer edge of the second positioning piece.

8. The fastening and automatic ejecting structure for a battery of a notebook as claimed in claim 1, wherein the computer is provided with an accommodating space having an opening for the battery to enter in; a stop piece disposed in the accommodating space in a way of retracting in a predetermined direction; a groove disposed on the outer edge of the battery and connected insertedly with the stop piece correspondingly.

9. The fastening and automatic ejecting structure for a battery of a notebook as claimed in claim 8, wherein the extracting direction of the stop piece is perpendicular to the direction in which the battery enters into or comes out of the accommodating space.

10. The fastening and automatic ejecting structure for a battery of a notebook as claimed in claim 9, further comprising an electromagnetic valve disposed at a predetermined position of the computer to control the position in which the stop piece is located.

11. The fastening and automatic ejecting structure for a battery of a notebook as claimed in claim 8, further comprising an electromagnetic valve disposed at a predetermined position of the computer to control the position in which the stop piece is located.

* * * * *